United States Patent
Axmon et al.

(10) Patent No.: US 10,419,962 B2
(45) Date of Patent: Sep. 17, 2019

(54) WIRELESS DEVICE, NETWORK NODE AND METHODS THEREFOR, AND COMPUTER PROGRAMS

(71) Applicant: Telefonaktiebolaget LM Ericsson (PUBL), Stockholm (SE)

(72) Inventors: Joakim Axmon, Malmö (SE); Muhammad Kazmi, Sundbyberg (SE); Santhan Thangarasa, Vällingby (SE)

(73) Assignee: Telefonaktiebolaget LM Ericsson (Publ) (SE)

( * ) Notice: Subject to any disclaimer, the term of this patent is extended or adjusted under 35 U.S.C. 154(b) by 28 days.

(21) Appl. No.: 15/531,519

(22) PCT Filed: Apr. 26, 2017

(86) PCT No.: PCT/EP2017/059951
§ 371 (c)(1),
(2) Date: May 30, 2017

(87) PCT Pub. No.: WO2017/191012
PCT Pub. Date: Nov. 9, 2017

(65) Prior Publication Data
US 2018/0192313 A1 Jul. 5, 2018

Related U.S. Application Data

(60) Provisional application No. 62/331,120, filed on May 3, 2016.

(51) Int. Cl.
*H04B 7/06* (2006.01)
*H04B 7/08* (2006.01)
(Continued)

(52) U.S. Cl.
CPC .......... *H04W 24/10* (2013.01); *H04B 7/0495* (2013.01); *H04B 7/0613* (2013.01);
(Continued)

(58) Field of Classification Search
CPC ...... H04B 7/04; H04B 7/0491; H04B 7/0495; H04B 7/06; H04B 7/0602;
(Continued)

(56) References Cited

U.S. PATENT DOCUMENTS

| 2014/0078912 A1* | 3/2014 | Park | H04L 5/0048 370/252 |
| 2014/0141792 A1* | 5/2014 | Larsson | H04W 64/00 455/452.1 |

(Continued)

FOREIGN PATENT DOCUMENTS

| WO | 2012173540 A1 | 12/2012 | |
| WO | WO-2012173540 A1 * | 12/2012 | ............ H04W 64/00 |
| WO | WO-2014025302 A1 * | 2/2014 | ............ G01S 5/0205 |

OTHER PUBLICATIONS

International Search Report and Written Opinion dated Jun. 21, 2017 for International Application Serial No. PCT/EP2017/059951, International Filing Date: Apr. 26, 2017 consisting of 13-pages.
(Continued)

*Primary Examiner* — Timothy J Weidner
(74) *Attorney, Agent, or Firm* — Christopher & Weisberg, P.A.

(57) ABSTRACT

A method of a wireless device arranged to perform measurements of signals wirelessly transmitted from at least one network node and being associated with a first cell and a second cell, respectively. The signals to be measured include signals of a first type and a second type. If the signals of the first type associated with the first cell and the second cell occur simultaneously, the signal of the first type associated with the first cell and the signal of the second type associated with the second cell are measured. If the signals of the first type associated with the first cell and the second cell do not occur simultaneously, the signal of the first type associated
(Continued)

with the first cell and the signal of the first type associated with the second cell are measured.

17 Claims, 6 Drawing Sheets

(51) Int. Cl.
| | |
|---|---|
| H04B 17/309 | (2015.01) |
| H04B 17/318 | (2015.01) |
| H04B 17/364 | (2015.01) |
| H04J 3/14 | (2006.01) |
| H04J 11/00 | (2006.01) |
| H04L 5/00 | (2006.01) |
| H04W 4/70 | (2018.01) |
| H04W 8/24 | (2009.01) |
| H04W 24/10 | (2009.01) |
| H04W 28/02 | (2009.01) |
| H04W 52/02 | (2009.01) |
| H04W 52/16 | (2009.01) |
| H04W 52/24 | (2009.01) |
| H04W 52/32 | (2009.01) |
| H04W 52/38 | (2009.01) |
| H04W 52/50 | (2009.01) |
| H04W 56/00 | (2009.01) |
| H04W 72/04 | (2009.01) |
| H04W 72/12 | (2009.01) |
| H04B 7/0495 | (2017.01) |

(52) U.S. Cl.
CPC ......... *H04B 7/0814* (2013.01); *H04B 17/309* (2015.01); *H04B 17/318* (2015.01); *H04B 17/364* (2015.01); *H04J 3/14* (2013.01); *H04J 11/0093* (2013.01); *H04L 5/0092* (2013.01); *H04L 5/0094* (2013.01); *H04L 5/0096* (2013.01); *H04W 4/70* (2018.02); *H04W 8/245* (2013.01); *H04W 28/0205* (2013.01); *H04W 28/0215* (2013.01); *H04W 28/0247* (2013.01); *H04W 52/0212* (2013.01); *H04W 52/0229* (2013.01); *H04W 52/0245* (2013.01); *H04W 52/16* (2013.01); *H04W 52/241* (2013.01); *H04W 52/245* (2013.01); *H04W 52/325* (2013.01); *H04W 52/386* (2013.01); *H04W 52/50* (2013.01); *H04W 56/0015* (2013.01); *H04W 72/042* (2013.01); *H04W 72/0473* (2013.01); *H04W 72/1289* (2013.01); *H04J 2011/0096* (2013.01)

(58) Field of Classification Search
CPC ........... H04B 7/0608–0613; H04B 7/08–0814; H04B 17/0082; H04B 17/10; H04B 17/101; H04B 17/15; H04B 17/18; H04B 17/20; H04B 17/24; H04B 17/30–373; H04J 3/14; H04J 11/0023–0093; H04J 2011/0096; H04L 5/0091–0098; H04W 4/70; H04W 8/22–245; H04W 24/02–10; H04W 28/02–0247; H04W 28/06; H04W 36/04; H04W 36/20; H04W 36/30; H04W 52/0209–0245; H04W 52/04–245; H04W 52/32–346; H04W 52/38–50; H04W 56/001–003; H04W 72/005–14

See application file for complete search history.

(56) References Cited

U.S. PATENT DOCUMENTS

2015/0230112 A1* 8/2015 Siomina ............... G01S 5/0205
370/252
2015/0372792 A1* 12/2015 Damnjanovic ....... H04L 5/0048
370/329

OTHER PUBLICATIONS

3GPP TSG-RAN WG4 #78 Kista, Sweden—R4-78AH-0048 Source: Nokia, Title: Measurement performance and simulation results for NB-loT In-band deployment, Agenda Item 6.1, Document for: Discussion May 3-4, 2016 consisting of 13-pages.

* cited by examiner

WIRELESS DEVICE, NETWORK NODE AND METHODS THEREFOR, AND COMPUTER PROGRAMS

CROSS-REFERENCE TO RELATED APPLICATIONS

This application is a Submission Under 35 U.S.C. § 371 for U.S. National Stage Patent Application of International Application Number: PCT/EP2017/059951, filed Apr. 26, 2017 entitled "WIRELESS DEVICE, NETWORK NODE AND METHODS THEREFOR, AND COMPUTER PROGRAMS," which claims priority to U.S. Provisional Application No. 62/331,120, filed May 3, 2016, entitled "WIRELESS DEVICE, NETWORK NODE AND METHODS THEREFOR, AND COMPUTER PROGRAMS," the entirety of both which are incorporated herein by reference.

TECHNICAL FIELD

The present invention generally relates to wireless device, network node and methods therefor, and computer programs for implementing the methods in the wireless device and the network node, respectively. In particular, the present invention relates to reducing activity time for the wireless device for making cell measurements.

Abbreviations

ANR Automatic neighbour relation
BW Bandwidth
CE Coverage enhancement
CP Cyclic prefix
DCI Downlink control information
DFT Discrete Fourier transform
DMRS Demodulation reference signal
DRX Discontinuous reception
eMTC Evolved MTC
EUTRA(N) Evolved universal terrestrial radio access (network)
FDD Frequency division duplex
GERAN GSM EDGE radio access network
GSM Global system for mobile communication
HARQ Hybrid automatic repeat request
HD-FDD Half-duplex FDD
IoT Internet of things
LTE Long term evolution of UMTS
MAC Media access control
MIB Master information block
MTC Machine type communication
NB-IoT Narrowband IoT
NB-PBCH Narrowband PBCH
NB-PDCCH Narrowband PDCCH
NB-PDSCH Narrowband PDSCH, aka NPDSCH
NB-PSS Narrowband PSS, aka NPSS
NB-RS Narrowband reference signal, aka NRS
NB-SSS Narrowband SSS, aka NSSS
NB-PUSCH Narrowband PUSCH
NTA Non-time alignment
OFDM Orthogonal frequency division multiplexing
PA Power amplifier
PBCH Physical broadcast channel
PDCCH Physical downlink control channel
PDSCH Physical downlink shared channel
PRACH Physical random access channel
PRB Physical resource block
PSS Primary synchronization signal
PUCCH Physical uplink control channel
PUSCH Physical uplink shared channel
RA Random access
RRC Radio resource control
RSRP Reference signal received power
RSRQ Reference signal received quality
Rx Receive(r)
SON Self-organizing network
SRS Sounding reference signal
SSS Secondary synchronization signal
TA Timing advance
TAC Timing advance command
TAG Timing advance group
TDD Time division duplex
Tx Transmit(ter)
TTI Transmission time interval
UE User equipment
UL Uplink

BACKGROUND

For example, Narrow Band Internet of Things (NB-IoT) devices often aim for very low power consumption. Such low power consumption may for example enable that a wireless device endures several years without battery charge/replacement.

To reach very low power consumption, one approach is to reduce time when the wireless device is active. It is therefore a desire to enable reduced activity time for the wireless device.

SUMMARY

The invention is based on the understanding that reduced activity time of a transceiver of a wireless device enables low power consumption. The inventors have found that this can be accomplished by arranging the wireless device to perform measurements adaptively based on the timing of the signals to measure, and that a network node can facilitate measurements by adapting timing of the signals.

Aspects of the invention are defined by the independent claims. Embodiments thereof are defined by dependent claims.

Other aspects may be considered. According to a first other aspect, there is provided a method of a wireless device arranged to perform measurements of signals wirelessly transmitted from at least one network node and being associated with a first cell and a second cell. The signals to be measured comprise signals of a first type and a second type. The method comprises determining whether the signals of the first type associated with the first cell and the second cell occur simultaneously. If the signals of the first type associated with the first cell and the second cell occurs simultaneously, the method includes measuring the signal of the first type associated with the first cell and measuring the signal of the second type associated with the second cell, and if the signals of the first type associated with the first cell and the second cell does not occur simultaneously, the method includes measuring the signal of the first type associated with the first cell and the signal of the first type associated with the second cell.

According to a second other aspect, there is provided a method of a network node arranged to wirelessly transmit signals to be measured by a wireless device wherein the signals comprises signals of a first type and a second type. The method comprises adjusting power of the signals of the first type to be equal to the signals of the second type.

The method may comprise determining timing relation of signals wirelessly transmitted from at least one network node and being associated with a first cell and a second cell, and adjusting timing of the signals of the first type associated with the first cell such that the they do not occur simultaneously with the signals of the first type associated with the second cell.

The method may comprise configuring, for the wireless device, a DRX cycle not larger than a certain threshold.

The method may comprise configuring, for the wireless device, a DRX cycle which is not an eDRX cycle.

According to a third other aspect, there is provided a wireless device arranged to perform the method according to the first other aspect.

According to a fourth other aspect, there is provided a network node arranged to perform the method according to the second other aspect.

According to a fifth other aspect, there is provided a computer program comprising instructions which, when executed on a processor of a wireless device, causes the wireless device to perform the method according to the first other aspect.

According to a sixth other aspect, there is provided a computer program comprising instructions which, when executed on a processor of a network node, causes the network node to perform the method according to the second other aspect.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings.

DETAILED DESCRIPTION

Figure 1:
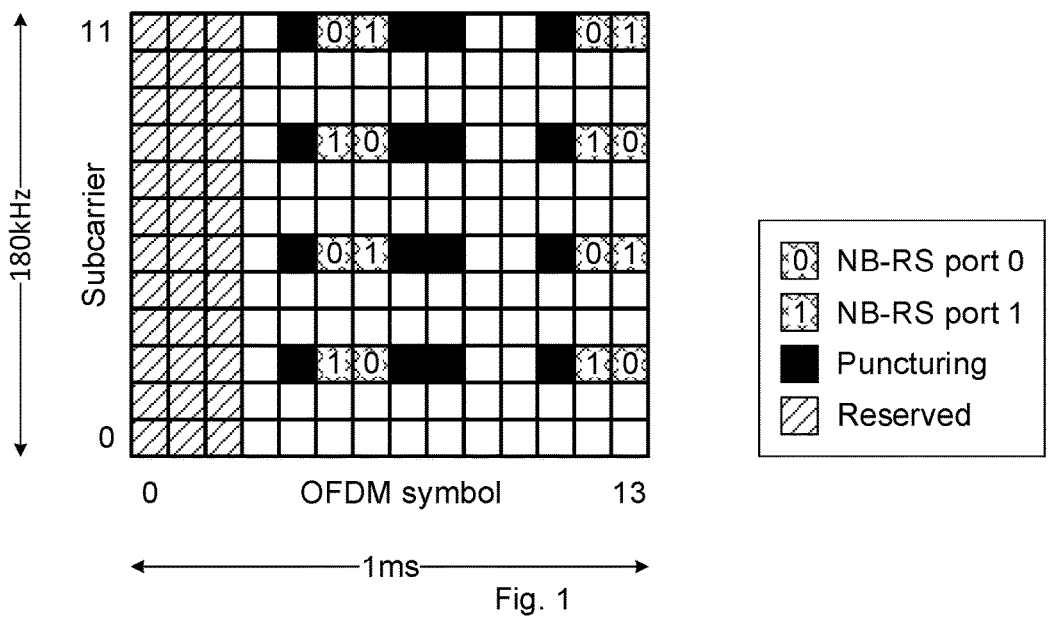
FIG. 1 schematically illustrates a layout of one type of signals in a subframe according to an embodiment.

An objective of NB-IoT is to specify a radio access for cellular internet of things (TOT), based to a great extent on a non-backward-compatible variant of E-UTRA, that addresses for example improved indoor coverage, support for massive number of low throughput devices, low delay sensitivity, ultra-low device cost, low device power consumption and (optimized) network architecture.

In the example indicated above, the NB-IoT carrier BW (Bw2) is 200 KHz. Examples of operating bandwidth (Bw1) of LTE are 1.4 MHz, 3 MHz, 5 MHz, 10 MHz, 15 MHz, 20 MHz etc., where NB-IoT may support 3 different deployment scenarios:

1. 'Stand-alone operation' utilizing for example the spectrum currently being used by GERAN systems as a replacement of one or more GSM carriers. In principle it operates on any carrier frequency which is neither within the carrier of another system not within the guard band of another system's operating carrier. The other system can be another NB-IoT operation or any other RAT e.g. LTE.
2. 'Guard band operation' utilizing the unused resource blocks within a LTE carrier's guard-band. The term guard band may also interchangeably called as guard bandwidth. As an example in case of LTE BW of 20 MHz (i.e. Bw1=20 MHz or 100 RBs), the guard band operation of NB-IoT can place anywhere outside the central 18 MHz but within 20 MHz LTE BW.
3. 'In-band operation' utilizing resource blocks within a normal LTE carrier. The in-band operation may also interchangeably be called in-bandwidth operation. More generally the operation of one RAT within the BW of another RAT is also called as in-band operation. As an example in a LTE BW of 50 RBs (i.e. Bw1=10 MHz or 50 RBs), NB-IoT operation over one resource block (RB) within the 50 RBs is called in-band operation.

In such NB-IoT, the downlink transmission is based on OFDM with 15 kHz subcarrier spacing and same symbol and cyclic prefix durations as for legacy LTE for all the scenarios: standalone, guard-band, and in-band In this example, for uplink transmission, both multi-tone transmissions based with a 15 kHz subcarrier spacing on SC-FDMA, and single tone transmission, with either 3.75 kHz or 15 kHz subcarrier spacing, are supported.

This means that the physical waveforms for NB-IoT in downlink and also partly in uplink is similar to legacy LTE.

In the description below, the terms "UE", "wireless communication device" and "wireless device" are used interchangeably. Furthermore, the reference to "UE activity" or "wireless device activity" should be interpreted as when a transceiver or modem, which terms also may be used interchangeably, of the UE or wireless device is active, i.e. receiving or transmitting. Thus, other parts of the wireless device or UE, e.g. processors, clock circuits, memory, attached equipment, etc., being active or inactive are not subject of this disclosure.

In the downlink design, NB-IoT supports both master information broadcast and system information broadcast which are carried by different physical channels. For in-band operation, it is possible for a NB-IoT UE to decode NB-PBCH without knowing the legacy PRB index. NB-IoT supports both downlink physical control channel (NB-PDCCH) and downlink physical shared channel (NB-PDSCH). The operation mode of NB-IoT must be indicated to the UE, and currently 3GPP consider indication by means of NB-SSS, NB-MIB or perhaps other downlink signals.

NB-IoT reference signals, NB-RS, are separate from legacy LTE Cell-specific Reference Signal, CRS, but the design principle is similar; they do not overlap with legacy CRS or PDCCH, they can be turned off in subframes when NB-PDSCH/NB-PSCCH is not transmitted, and the subcarriers used is derived from PCI. Downlink synchronization signals will consist of primary synchronization signal (NB-PSS), transmitted in subframe #5 in every radio frame, and secondary synchronization signal (NB-SSS), transmitted in subframe #9, according to one example, but other periodicity may be considered.

It has been agreed to support multi-PRB operation in 3GPP Rel-13. In this case NB-PSS, NB-SSS, PBCH and system information is broadcasted only on one (or more) anchor-PRB(s) and upon connection setup UEs can be assigned to carry out their connected sessions on other "secondary-PRBs" not containing these signals. UEs will therefore monitor paging and perform Random Access and RRC Connection Setup on the anchor carrier, transmit user plane data on the secondary-PRB and once released to RRC Idle mode they will return to the anchor-PRB (unless directed elsewhere). Because of this, UE measurements based on the previously mentioned physical channels cannot be performed on the secondary PRB.

Note that it is possible that the anchor-PRB and the secondary-PRB belong to different deployment scenarios. For example, the anchor-PRB can be in the guard band whereas the secondary-PRB are in-band, in which case there are only reference symbols, NB-RS, available on the anchor-PRB whereas both NB-RS and legacy CRS are available on the secondary-PRB.

Further, some (but not all) PRBs can be power boosted for the in-band deployment scenario and typically the anchor-PRB would be power boosted to ensure good reception of NB-PSS, NB-SSS, PBCH, and NB-PDCCH.

The term anchor PRB may interchangeably be called as primary PRB, basic PRS, common signal PRS, main PRS etc. The term secondary PRB may interchangeably be called companion PRS, booster PRS, data PRS etc. The term PRB may interchangeably be called cell, NB cell, NB resource, resource block (RB), virtual RB (VRB), physical resource etc.

FIG. 1 illustrates a layout of NB-RS in a subframe and with 12 subcarriers according to an embodiment. NB-RS symbols for 2-port MIMO (port 0 and port 1) are illustrated.

Figure 2:
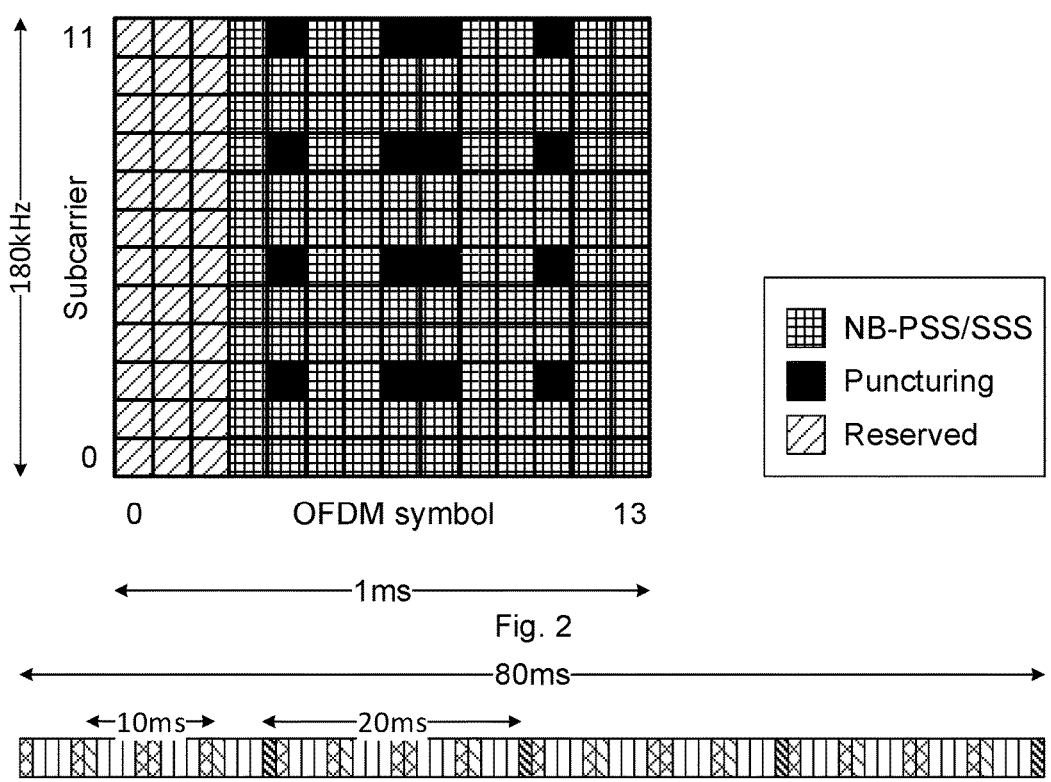
FIG. 2 schematically illustrates a layout of another type of signals in a subframe according to an embodiment.

FIG. 2 illustrates a layout of NB-PSS and NB-SSS in a subframe and with 12 subcarriers according to an embodiment.

Figure 3:
FIG. 3 illustrates a slot layout for different types of signals according to an embodiment.

FIG. 3 illustrates slot layout for NB-RS, NB-PSS and NB-SSS according to an embodiment.

Radio measurements done by the UE are typically performed on the serving as well as on neighbour cells (e.g. NB cells, NB PRB etc.) over some known reference symbols or pilot sequences e.g. NB-CRS, NB-SSS, NB-PSS etc. The measurements are done on cells on an intra-frequency carrier, inter-frequency carrier(s) as well as on inter-RAT carriers(s) (depending upon the UE capability whether it supports that RAT). To enable inter-frequency and inter-RAT measurements for the UE requiring gaps, the network has to configure the measurement gaps.

The measurements are done for various purposes. Some example measurement purposes are: mobility, positioning, self-organizing network (SON), minimization of drive tests (MDT), operation and maintenance (O&M), network planning and optimization etc. Examples of measurements in LTE are Cell identification aka PCI acquisition, Reference Symbol Received Power (RSRP), Reference Symbol Received Quality (RSRQ), cell global ID (CGI) acquisition, Reference Signal Time Difference (RSTD), UE RX-TX time difference measurement, Radio Link Monitoring (RLM), which consists of Out of Synchronization (out of sync) detection and In Synchronization (in-sync) detection etc. CSI measurements performed by the UE are used for scheduling, link adaptation etc. by network. Examples of CSI measurements or CSI reports are CQI, PMI, RI etc. They may be performed on reference signals like CRS, CSI-RS or DMRS.

In order to identify an unknown cell (e.g. new neighbour cell) the UE has to acquire the timing of that cell and eventually the physical cell ID (PCI). In legacy LTE operation the DL subframe #0 and subframe #5 carry synchronization signals (i.e. both PSS and SSS). The synchronization signals used for NB-IoT are known as NB-PSS and NB-SSS and their periodicity may be different from the LTE legacy synchronization signals. This is called as cell search or cell identification. Subsequently the UE also measures RSRP and/or RSRQ of the newly identified cell in order to use itself and/or report the measurement to the network node. In total there are 504 PCIs in NB-IoT RAT. The cell search is also a type of measurement. The measurements are done in all RRC states i.e. in RRC idle and connected states. In RRC connected state the measurements are used by the UE for one or more tasks such as for reporting the results to the network node. In RRC idle the measurements are used by the UE for one or more tasks such as for cell selection, cell reselection etc.

The UE can perform radio measurements like RSRP, RSRQ etc. more accurately on more dense reference signals like NB-SSS than on NB-RS. However, the dense reference signals like NB-SSS in NB-IoT may not be transmitted very frequently e.g. not every frame, as can be seen from for example FIG. 3. Due to this limitation it may be difficult for the UE to perform measurements on multiple cells around the same time in some network implementation, e.g. when cells are synchronized.

An approach is that a wireless communication device operates for scheduling of signal strength (e.g. RSRP, path loss) and signal quality measurements (e.g. RSRQ, RS-SINR), when the wireless communication device being operated in a NB-IoT network with at least a first and a second cell. The approach may comprise:

Determining a time difference between secondary synchronization signals transmitted in the first and the second cell (SSTD), respectively;

Determining for each respective cell, based on at least the SSTD, whether to measure signal strength and signal quality based on a first type of reference signal (e.g. NB-SSS) or on a second type of reference signal (e.g. NB-RS);

Scheduling the measurement activities over time periods T1 and T2 for first and second cell, respectively, and where T1 and T2 at least partially overlap.

Furthermore, for the case when it is decided due to synchronization signals being transmitted in an overlapping fashion (here also taking into account required radio switching time when applicable, time for switching context in the baseband, and the alike) that one cell shall be measured using NB-RS and the other using NB-SSS;

Determining based on relative radio conditions (as can be prior known from UE history or can be determined during the cell search operation) that the cell in the least favourable radio conditions is to be measured using NB-SSS.

An approach for a network node, which may be arranged for serving or managing a first cell (Cell A) and/or a second cell (Cell B), is also provided for enabling the desired shorter activity time for the wireless device. The approach may comprise:

Determining that a wireless device is configured to perform measurements on Cell A and Cell B;

Adapting time offset between transmit timings of Cell A and/or Cell B based on comparison between a length of DRX cycle used by the wireless device with a DRX cycle threshold, or Adapting at least one parameter related to the DRX cycle (e.g. length, paging occasion (PO) length, number of shorter DRX cycles within PO etc.) used by the wireless device based on the time offset between transmit timings of Cell A and/or Cell B;

Configuring one or more adapted parameters related to Cell A and/or Cell B and/or the UE.

The approach for the network node may include assigning equal transmit power for NB-SSS and NB-RS, which would facilitate measurements for the UE applying the approach demonstrated above.

The approach for the network node may alternatively include providing information on transmit power difference between NB-RS and NB-SSS to the UE, which would enable for the UE to easily take the power difference into account when applying the approach demonstrated above.

Should the network node not support transmission of NB-RS and NB-SSS using the same transmit power level, or signalling on the transmit power difference between NB-RS and NB-SSS, the UE may determine the power difference itself by estimating the difference in received power between NB-RS and NB-SSS, and use this determined power difference for using NB-SSS measurements as a proxy for NB-RS measurements.

Cell measurements based on NB-SSS reduces the radio activity time compared to collecting the same number of REs from NB-RS. Reduced radio activity time hence leads to prolonged time of operation between battery replacements.

Interleaving measurements for different cells on different carriers reduce the time for the transceiver of the wireless device to be active and thus further prolonged time between battery replacements.

The approach allows efficient measurement scheme to be used where both radio activity time and transceiver activity time of the wireless device are reduced compared to LTE legacy.

In some embodiments a more general term "network node" is used and it can correspond to any type of radio network node or any network node, which communicates with a UE and/or with another network node. Examples of network nodes are NodeB, MeNB, SeNB, a network node belonging to MCG or SCG, base station (BS), multi-standard radio (MSR) radio node such as MSR BS, eNodeB, network controller, radio network controller (RNC), base station controller (BSC), relay, donor node controlling relay, base transceiver station (BTS), access point (AP), transmission points, transmission nodes, RRU, RRH, nodes in distributed antenna system (DAS), core network node (e.g. MSC, MME etc.), O&M, OSS, SON, positioning node (e.g. E-SMLC), MDT etc.

In some embodiments the non-limiting terms UE or a wireless device are used interchangeably. The UE herein can be any type of wireless device capable of communicating with a network node or another UE over radio signals. The UE may also be a radio communication device, target device, device to device (D2D) UE, machine type UE or UE capable of machine to machine communication (M2M), low-cost and/or low-complexity UE, a sensor equipped with UE, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IoT) device etc.

Also in some embodiments the generic term "radio network node" is used. It can be any kind of a radio network node which may comprise any of base station, radio base station, base transceiver station, base station controller, network controller, RNC, evolved Node B (eNB), Node B, Multi-cell/multicast Coordination Entity (MCE), relay node, access point, radio access point, Remote Radio Unit (RRU), Remote Radio Head (RRH), etc.

The embodiments are applicable for a UE in a low or in high activity state. Examples of low activity state are RRC idle state, idle mode etc. Examples of high activity state are RRC CONNECTED state, active mode, active state etc. The UE may be configured to operate in DRX or in non-DRX. If configured to operate in DRX, it may still operate according to non-DRX as long as it receives new transmissions from the network node. A term extended DRX (eDRX) is used in some embodiments. An eDRX cycle is a DRX cycle larger than a threshold e.g. 2.56 seconds. The UE configured in eDRX receives paging during paging occasion comprising of one or plurality of shorter DRX cycles i.e. shorter than the eDRX cycle. The eDRX cycle can be as large as several hours e.g. up to 3 hours.

In some embodiments a first type of reference signal (RS1) and a second type of reference signal (RS2) are used. The first and the second types of reference signals differ in terms of their periodicity of occurrence and their density in time and/or frequency. RS1 is typically transmitted with longer periodicity than RS2. For example, RS1 can be transmitted in every second radio frame, while RS2 can be transmitted in every radio frame. But RS1 is typically transmitted with higher density than RS2. The density can be expressed in terms of number of resource elements containing reference signals in a certain time-frequency grid e.g. within N number of resource blocks. Examples of RS1 and RS2 are NB-SSS and NB-RS, respectively.

Figure 4:
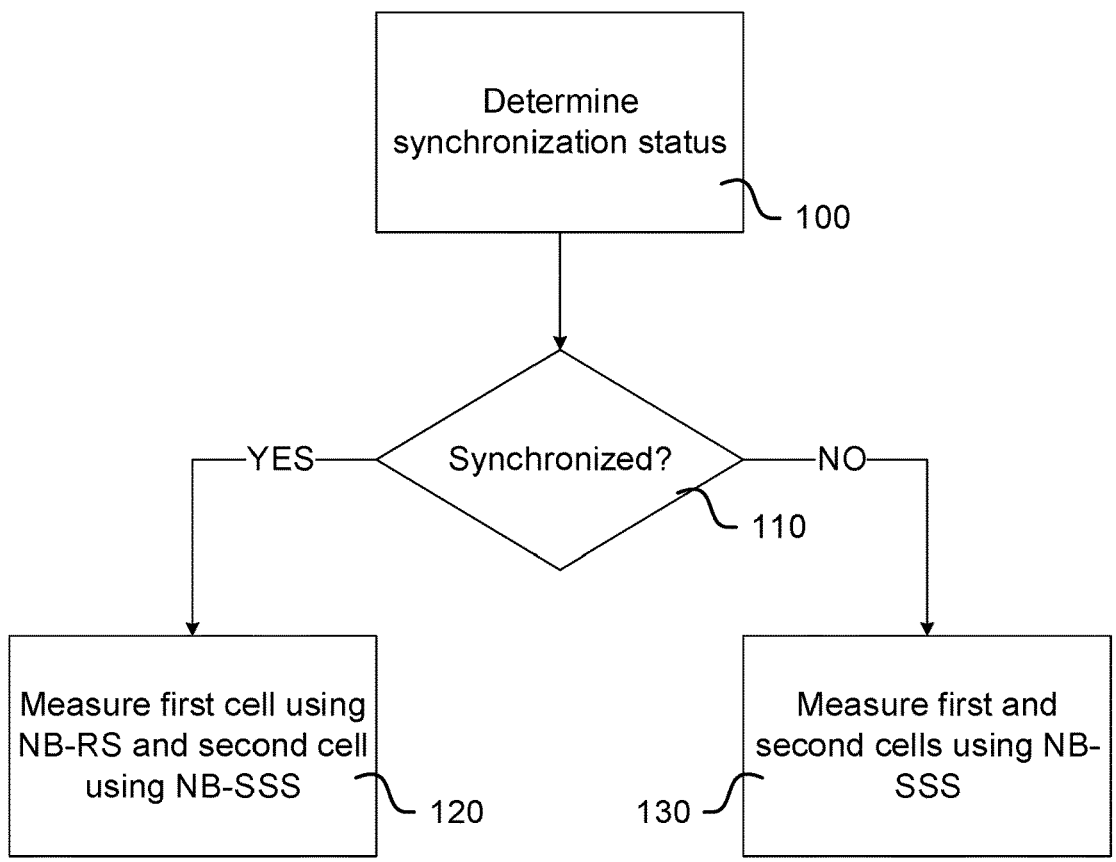
FIG. 4 is a flow chart illustrating a method of a wireless device according to an embodiment.

FIG. 4 is a flow chart illustrating a method for a UE according to an embodiment. This embodiment describes a method in a UE for adapting measurement procedure for performing one or more measurements in at least two cells by using the same type of RS such as RS1 in both cells or by using RS1 on one cell and RS2 on another cell or by using RS2 in both cells.

The embodiment is applicable for performing UE measurements on cells using any particular type of RS1 and RS2. However, for simplicity, the embodiment is described for the case when RS1 and RS2 are NB-SSS and NB-RS respectively.

The UE is determining 100 whether the NB-SSS from the first cell (Cell A) and the second cell (Cell B) are transmitted so close in time by which there will not be sufficient time to receive NB-SSS from the first cell and then switch radio and/or baseband context to receive NB-SSS from the second cell. If this is the case, the cells are considered to be synchronized 110 (YES), whereby cell measurements are carried out 120 in an interleaved fashion using NB-RS from one of the cells and NB-SSS from the other cell. As an example if the NB-SSS from the first and the second cell are transmitted within a time window which is not larger then certain time threshold then the two cells are considered to be synchronized by the UE. The level or extent of the synchronization between cells can also be determined based on time offset or time difference between the start of their frame timings. In another example the level or extent of the synchronization between cells can also be determined based on whether they have the same radio frame number or not e.g. same SFN or not. In general, an example of the time threshold is one time resource. Examples of time resource are CP length, symbol duration, time slot, TTI, subframe etc. The UE can determine the timing of the first and the second cells and also the timings of their respective NB-SSS during cell search procedure. The UE may store this timing information and use it for cell measurements e.g. NB-RSRP, NB-RSRQ etc. Should it be so that the wireless communication device determines that there is enough time between the transmission of NB-SSS in the first cell and second cell, respectively, i.e. not being synchronized 110 (NO), the cell measurements are carried out 130 in an interleaved fashion using NB-SSS from each of the cells.

The determination 100 of the synchronization status may utilize prior known information on synchronization between neighbour cells (UE history) or may be acquired by conducting cell search on one or more carriers, whereby for instance the first cell may be an already detected cell, and the second cell may be a candidate cell found during cell search and which is to be measured to confirm whether it is a real cell or a false detection. The determination 100 of the synchronization status may further utilize knowledge (e.g. provided via system information, i.e., control plane or stored information and/or historical data/statistics based on previous measurements etc.) on anchor cells handled under control of the same network node and transmitted in-band or in the guard band of an LTE cell. Furthermore, the wireless communication device may have acquired such information from a server, where the server may be a third party server and information is exchanged over the user plane.

Figure 12:
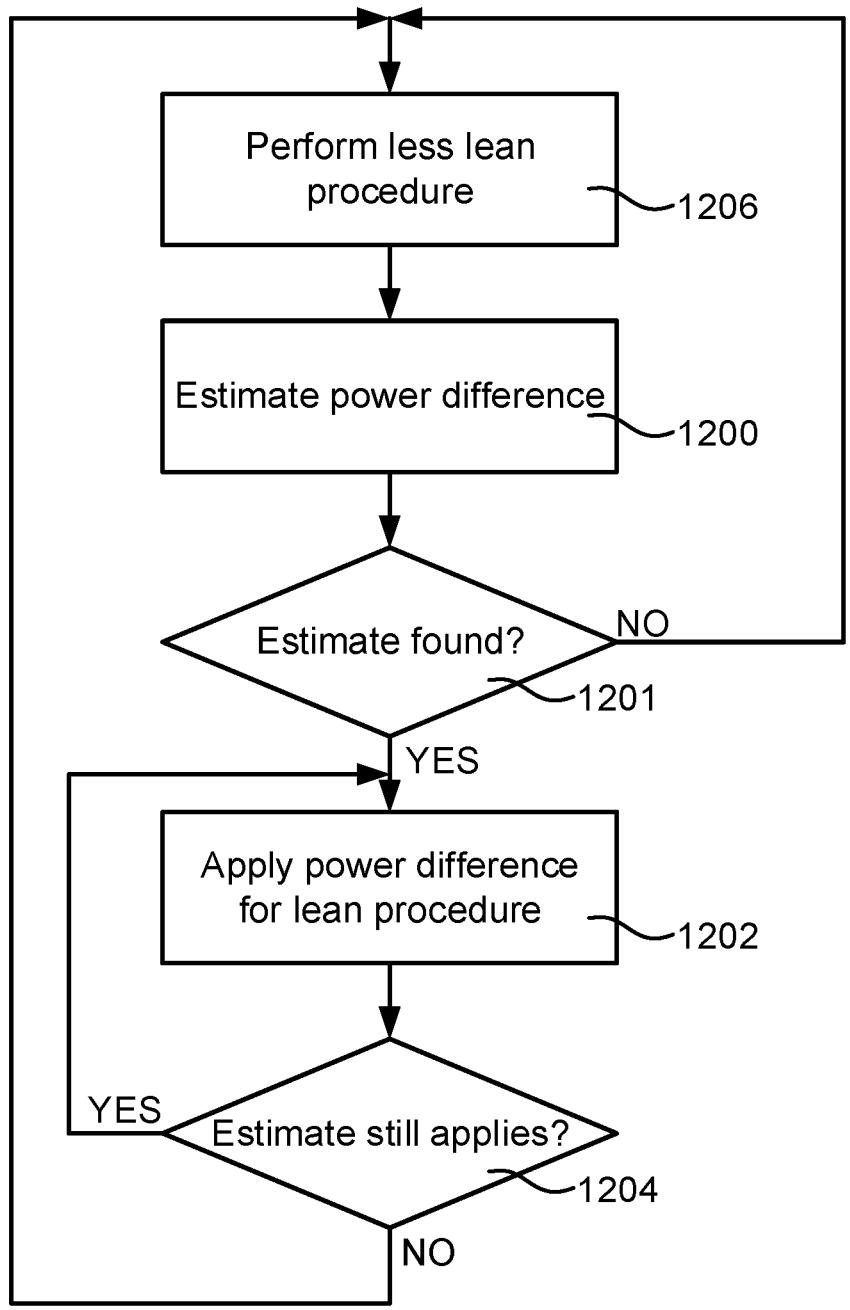
FIG. 12 is a flow chart illustrating determination of difference in transmit powers of different types of reference signals according to an embodiment.

For the measurements 120, 130 demonstrated above, the UE may benefit from knowing transmission powers of the respective reference signals. As discussed above, the network node may facilitate for the UE by keeping the transmit powers equal, or by providing information about relations between powers of the different reference signals. However, there may be network nodes which do not provide such facilitating measures. In such cases, the UE can, as schematically illustrated by the flow chart of FIG. 12, determine the transmit power difference by estimating 1200 the power difference between RS1 and RS2, by conducting relative measurements between RS1 and RS2, or absolute measurements for RS1 and RS2 over the same time frame and determining the difference in received power level and further determining that the difference in received power level between RS1 and RS2 depends on a difference in transmitted power level of the same.

The difference in transmit power level between broadcasted reference signals is normally a semi-static network setting. Hence, when a UE has established 1201; YES this once and apply 1202 the acquired knowledge until detection 1204; NO that the assumption no longer applies, e.g. due to a failed cell selection/re-selection. Moreover, when the UE does not have enough information about the relative transmit power level setting between RS1 and RS2, the UE may have to perform 1206 a less lean procedure, e.g. including to measure potential target cells sequentially, and while doing so, the UE may conduct parallel measurements on RS1 and RS2 in order to acquire information on transmit power level offset between RS1 and RS2. When the UE again has enough information 1201; YES, the UE may return to the lean procedure 1202 according to this disclosure.

The structure of the procedure above is also applicable for the procedure when information about the relation of the powers are provided by the network node, i.e. "estimate" may be substituted by "acquire information from the network node" etc.

Figure 5:
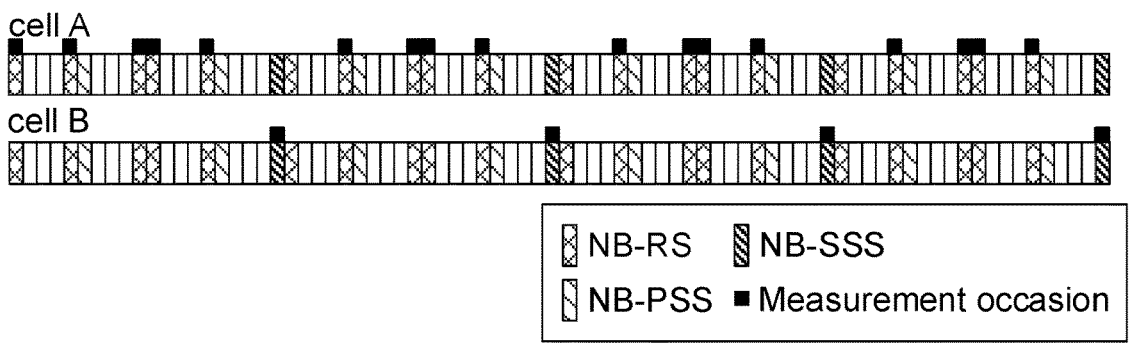
FIG. 5 is a slot diagram illustrating cells being synchronous.
Figure 6:
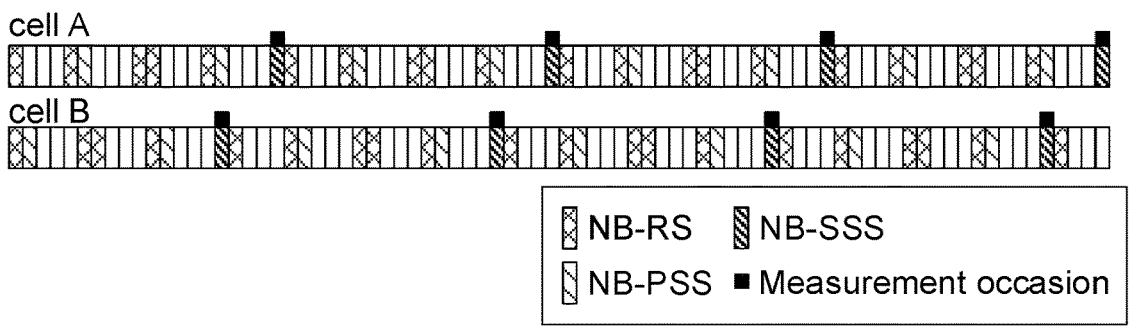
FIG. 6 is a slot diagram illustrating cells being asynchronous.

The operation of a wireless communication device using the invention is illustrated in FIGS. 5 and 6. In FIG. 5 Cell A and Cell B are synchronous wherein NB-SSS collides, wherein the UE measures Cell A based on NB-RS and Cell B based on NB-SSS. In FIG. 6 Cell A and Cell B are asynchronous wherein the UE can measure both Cell A and Cell B based on NB-SSS.

Without the above demonstrated approach, measurements of cells A and B would be based on NB-RS and would have to be carried out sequentially, leading to an acquisition time of T. With the above demonstrated approach, the acquisition time can be reduced down to T/2, hence leading to lower power consumption. FIG. 5 illustrates a scenario where the NB-SSS signals transmitted by cells A and B collide, whereby the wireless communication device determines to measure Cell A based on NB-RS, and Cell B based on NB-SSS. This corresponds to the left branch (110: YES, etc.) in FIG. 4. FIG. 6 illustrates a scenario where the secondary synchronization signals transmitted by cells A and B do not collide, and where there additionally is enough time between the NB-SSS transmitted by cells A and B respectively, whereby the wireless communication device determines to measure cells A and B based on NB-SSS. This corresponds to the right branch (110: NO, etc.) in FIG. 4. It shall be noted that in case the NB-SSS transmitted by cells A and B, respectively, do not collide but there is too little time for radio switching and/or baseband context switching (i.e. preparations for measuring Cell B after Cell A, and vice versa), the wireless communication device considers the cells to be synchronous and hence operates according to the left branch (110: YES, etc.) in FIG. 4.

By interleaving the measurements, power saving can be achieved since the wireless communication device can be in sleep state longer between e.g. eDRX on times such as when DRX cycle is larger than a threshold. Particularly, the wireless communication device can wake up closer to the eDRX on time compared to had cell measurements been acquired sequentially.

In yet another example, a threshold is used by the UE to determine whether Cell A and Cell B are synchronized or not. The threshold can be predefined e.g. in a specification. It may also be a configurable parameter that can be configured by the operator. The UE may also receive threshold information directly from the first network node, or from other transmitting network nodes. Examples of other transmitting nodes are third party nodes, relay UEs, core network nodes, or other UEs. In addition, the UE may also recommend a threshold to the first network node.

The UE may for example compare the received timings of cell A (T1) and cell B (T2). If it is decided that the difference ($|T1-T2|$) is equal or greater than this threshold, it may consider the cells to be unsynchronized (110: NO). In this case, the UE may carry out the measurements on cell A and cell B in an interleaved fashion using NB-SSS on each of the cells.

On the other hand, if this difference is smaller than the said threshold, the cells can be considered to be synchronized. In this case, the UE may perform measurement using NB-RS on one of the cell and using NB-SSS on the other cell.

In the above exemplary adaptation of the UE measurement procedures, after performing the measurements on Cell A and Cell B, the UE may use the obtained measurement results for one or more radio operational tasks. Examples of such tasks are:
- using the results for performing cell change e.g. cell reselection,
- using the results for determining UE location,
- transmitting the results to a network node.

The above exemplary adaptation of the UE measurement procedures may be applicable for any one or more of the following scenarios:
- Cell A and Cell B can be serving cell and neighbour cell,
- Cell A and Cell B can be reference cell and neighbour cell,
- Both Cell A and Cell B can be non-serving cells of the UE, i.e. neighbour cells of the UE's serving cell,
- The UE may perform one or more absolute measurements on Cell A and Cell B,
- The UE may perform one or more relative measurements on Cell A and Cell B, i.e. comparing measurement on Cell A with the measurement on Cell B or vice versa and use the results for one or more tasks.

The method in the UE can also be realized implicitly or explicitly by means of pre-defined requirements related to the measurements performed on Cell A and/or Cell B. The UE may have to meet such pre-defined requirements which may be specified in the standard. Examples of requirements are measurement time parameters, e.g. measurement period, measurement reporting delay, measurement accuracy or tolerance etc. This is explained with a few examples below:
- In one example it may be pre-defined that if Cell A and Cell B are unsynchronized then the UE may perform measurements on Cell A and Cell B by meeting more stringent requirements compared to the case when Cell A and Cell B are synchronized. Examples of more stringent requirements are shorter measurement time or period (e.g. 400 ms is more stringent than 800 ms), smaller measurement inaccuracy (e.g. ±2 dB is more stringent than of ±3 dB etc.).
- In another example it may be pre-defined that if Cell A and Cell B are unsynchronized then the UE may perform measurements on at least one of the Cell A and Cell B by meeting more stringent requirements compared to the case when Cell A and Cell B are synchronized.
- In yet another example it may be pre-defined that if Cell A and Cell B are synchronized then the UE may perform measurements on at least one of the Cell A and Cell B by meeting less stringent requirements compared to the case when Cell A and Cell B are unsynchronized.
- In yet another example it may be pre-defined that if Cell A and Cell B are synchronized then the UE may perform measurements on Cell A and Cell B by meeting less stringent requirements compared to the case when Cell A and Cell B are unsynchronized.

Figure 7:
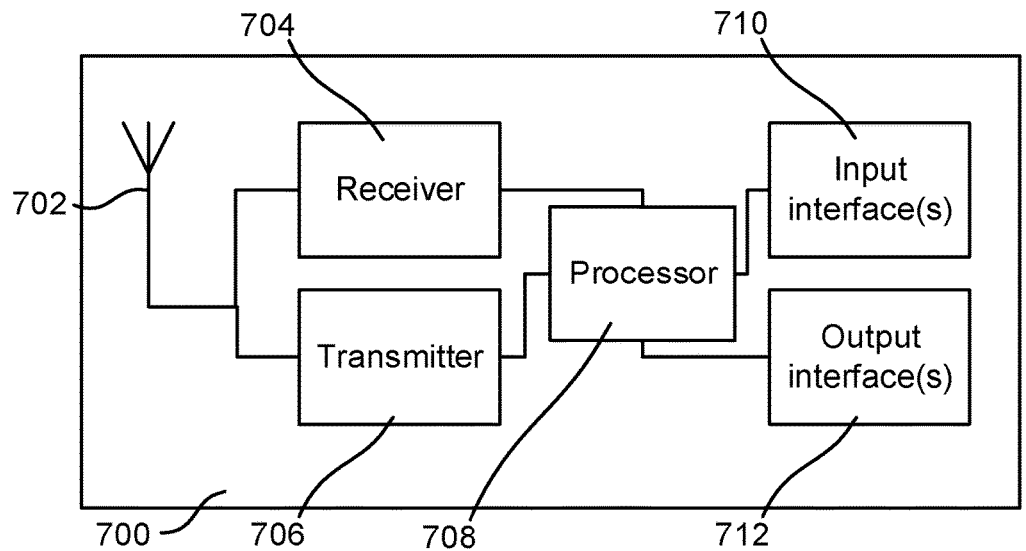
FIG. 7 is a block diagram schematically illustrating a wireless device according to an embodiment.

FIG. 7 is a block diagram schematically illustrating a UE 700 according to an embodiment. The UE comprises an antenna arrangement 702, a receiver 704 connected to the antenna arrangement 702, a transmitter 706 connected to the antenna arrangement 702, a processing element 708 which may comprise one or more circuits, one or more input interfaces 710 and one or more output interfaces 712. The interfaces 710, 712 can be user interfaces and/or signal interfaces, e.g. electrical or optical. The UE 700 is arranged to operate in a cellular communication network. In particular, by the processing element 708 being arranged to perform the embodiments demonstrated with reference to FIGS. 1 to 6 and 12, the UE 700 is capable of determining whether two NW nodes are synchronized or not, and adapt measurements accordingly. The processing element 708 can also fulfill a multitude of tasks, ranging from signal processing to enable reception and transmission since it is connected to the receiver 704 and transmitter 706, executing applications, controlling the interfaces 710, 712, etc.

For enhancing UE measurement procedure, a network node may be arranged for adapting configuration of one or more cells. This embodiment describes a method in a network node for adapting one or more cell configuration parameters related to cell configuration which are directly or indirectly used by the UE for performing one or more measurements on the cell. Examples of cell configuration parameters are transmit timing of a cell, DRX cycle or eDRX related parameters (e.g. length of DRX cycle, length of paging occasion of DRX cycle aka ON duration of DRX cycle etc).

This method can be performed in a first network node (NW1) serving Cell A and/or in a second network node (NW2) serving Cell B or in a third network node (NW3) serving or managing NW1 and/or NW2. In some examples NW1 and NW2 can be the same i.e. Cell A and Cell B are served by the same network node. A generic term network node is used for describing this embodiment but it can be any one or more of NW1, NW2 and NW3.

In one example of adaptation of the cell configuration parameters, the NW node adjusts the transmit timing of Cell A and/or Cell B to ensure that the transmission timings of RS1 and RS2 in Cell A and Cell B respectively are separated by at least a certain threshold. This is to ensure that the UE performing measurements on Cell A and Cell B would consider the cells as unsynchronized. This enables the UE to perform measurements on Cell A and Cell B using RS1 in both cells i.e. using NB-SSS transmitted in the respective cells.

In another example the NW node may adjusts the transmit timings of Cell A and/or Cell B to ensure that the transmission timings of RS1 and RS2 in Cell A and Cell B respectively are separated by at least a certain threshold (D) based on the DRX cycle configured for the UE doing measurements on Cell A and Cell B. As an example if the DRX cycle is larger than a threshold or if the DRX cycle is eDRX cycle then the NW node may adjust the transmit timings of Cell A and/or Cell B to ensure that the transmission timings of RS1 and RS2 in cell A and cell B respectively are separated by at least D.

In yet another example of the adaptation of the cell configuration parameters, the NW node may adjust the DRX cycle of the UE performing measurements on Cell A and Cell B based on the transmit timings of Cell A and/or Cell B to enable the UE to enhance the measurement procedures. For example, if the two cells are synchronized (e.g. time offset between the transmit timing of 2 cells is below threshold) then the NW node configures the UE with a DRX cycle not larger than a certain threshold or with a DRX cycle which is not eDRX cycle.

In one example, the network node may configure the UE with a threshold that the UE may use to evaluate if two or more cells are considered to be synchronized. The determination of threshold value can be based on already known information to the network node, e.g. using some SON or ANR functionalities. The network node may configure the UE using dedicated signalling or broadcast signalling for all its connected UEs. In addition, the network node may also receive recommended value for the threshold directly from the UE, or from other UEs in the same cell or in the same area etc. The network node may configure the UE with the received threshold.

In addition, network node may also adapt its behaviour based on the type of signals the UE is expected to perform measurement on. Adaptation in this sense comprises the network node ensuring that the measured signals are transmitted from the network node such that it can be used to perform measurement. For example, if two or more signals are to be used for measurement in an interleaved fashion, the network node may ensure that the transmitted power per resource element is equal. Alternatively, the network node may provide information on transmit power difference between NB-RS and NB-SSS to the UE, which would enable for the UE to easily take the power difference into account. In yet another example, if the UE is to use two or more type of signals to perform the same measurement, the network node may ensure that the two or more type of signals are transmitted using the same power per resource element to enable combining of these at the node performing the measurement. If the pattern or sequence comprising the signals used for measurement is known to the network node, the network node may adapt its behaviour accordingly.

Should the network node not support equal transmit power for RS1 and RS2, and not support signalling of the transmit power difference between RS1 and RS2, the UE can determine the transmit power difference by estimating the power difference between RS1 and RS2, by conducting relative measurements between RS1 and RS2, or absolute measurements for RS1 and RS2 over a transmission limited in time, e.g. the same time frame, wherein impact of other differences are assumed to be limited, and determining the difference in received power level and further determining that the difference in received power level between RS1 and RS2 depends on a difference in transmitted power level of the same.

Difference in transmit power level between broadcasted signals is a semi-static network setting. Hence, a UE can establish this once and apply the acquired knowledge until it becomes evident that the assumption no longer applies, e.g. due to a failed cell selection/re-selection. Moreover, before the UE has gathered any information about the relative transmit power level setting between RS1 and RS2, the UE may have to measure potential target cells sequentially, and while doing so, the UE may conduct parallel measurements on RS1 and RS2 in order to acquire information on transmit power level offset between RS1 and RS2.

Figure 8:
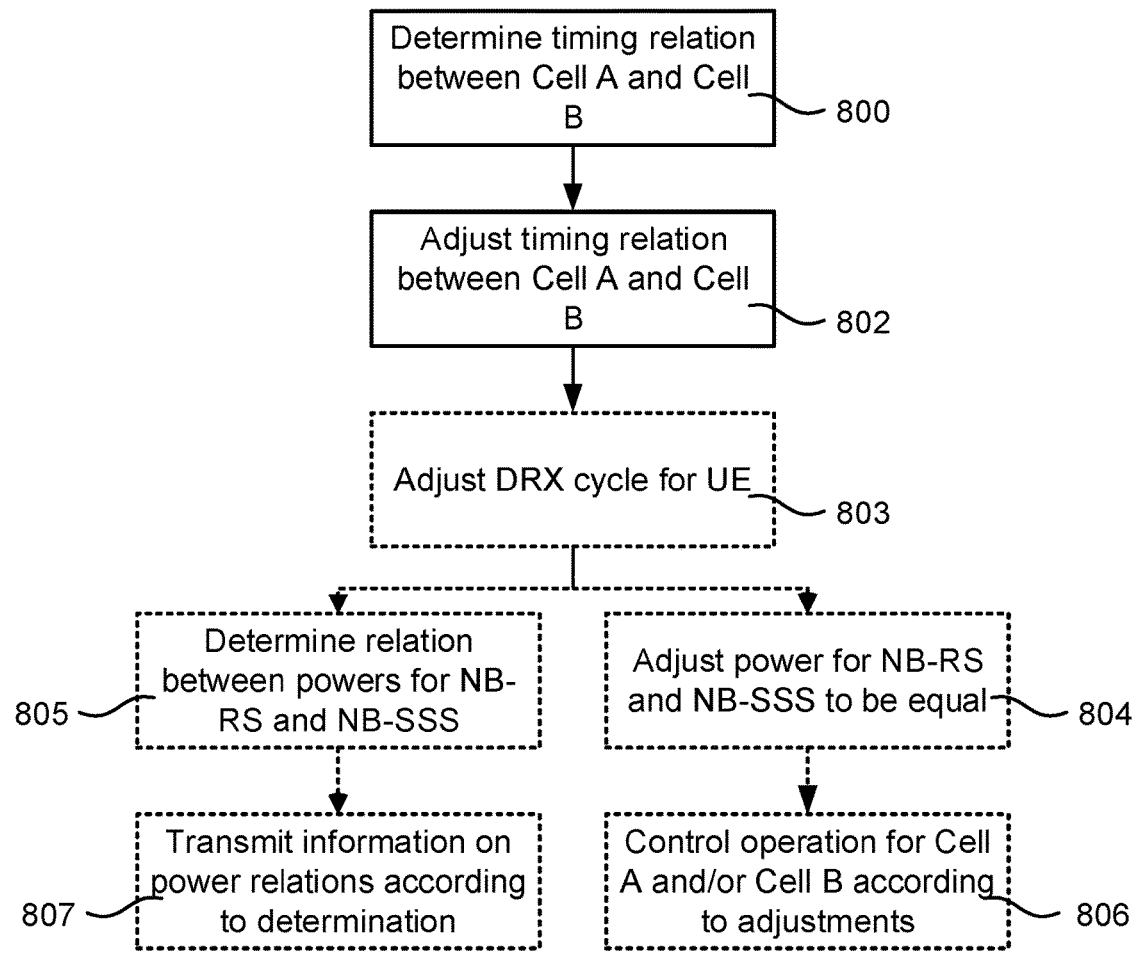
FIG. 8 is a flow chart illustrating a method of a network node according to an embodiment.

FIG. 8 is a flow chart illustrating a method for a NW node according to an embodiment. Here, the NW node may be either of the NW node operating Cell A (as referred above), the NW node operating Cell B, a NW node cooperating with the NW nodes operating cells A and B or a NW node operating both cells A and B. The NW node determines 800 a timing relation between Cell A and Cell B to know whether transmission timings of RS1 and RS2, as elucidated above, are separated such that a UE is enabled to measure e.g. RS1 from both cells during a limited transceiver activity time of the UE, i.e. the e.g. RS1 timings for the cells are at least not completely overlapping and/or not too far apart for a reasonable measurement instant. If the timing can be improved such that a feasible adjustment of timing relation between the cells implies a neat measurement as elucidated above, the timing relation between Cell A and Cell B is adjusted 802. This may be by adjusting timing of Cell A or of Cell B, or both, depending on what cell the NW node is capable of adjusting, and/or what cell that is feasible/suitable for timing adjustment. Here it should be noted that if timing relation between Cell A and Cell B happens to be suitable, e.g. for other reasons than being adjusted by the NW node, for neat measurements by the UE, and this may be assumed, the actions 800 and 802 are not necessary. The NW node may also adjust 803 DRX cycle for the UE, as demonstrated above, such that it configures the UE with a DRX cycle not larger than a certain threshold or with a DRX cycle which is not eDRX cycle. For making the measurements reasonable or at least easier, when measuring either RS1 or RS2, the different types of reference signals, i.e. RS1 and RS2, may optionally be adjusted 804 to have equal power. When any such adjustments are settled, operation of Cell A and/or Cell B, as elucidated above, is controlled 806 accordingly. As an alternative, the network node may support signalling of the transmit power difference between RS1 and RS2, wherein the UE can determine the transmit power difference from the signalling. For this option, the network node determines 805 a relation between powers of RS1 and RS2, e.g. NB-RS and NB-SSS. The network node then transmits 807 information on the power relations according to the determination to the UE.

There may be network nodes which do not provide any such facilitating measures as those discussed above. In such case, the UE may estimate any power differences, as discussed above.

Figure 9:
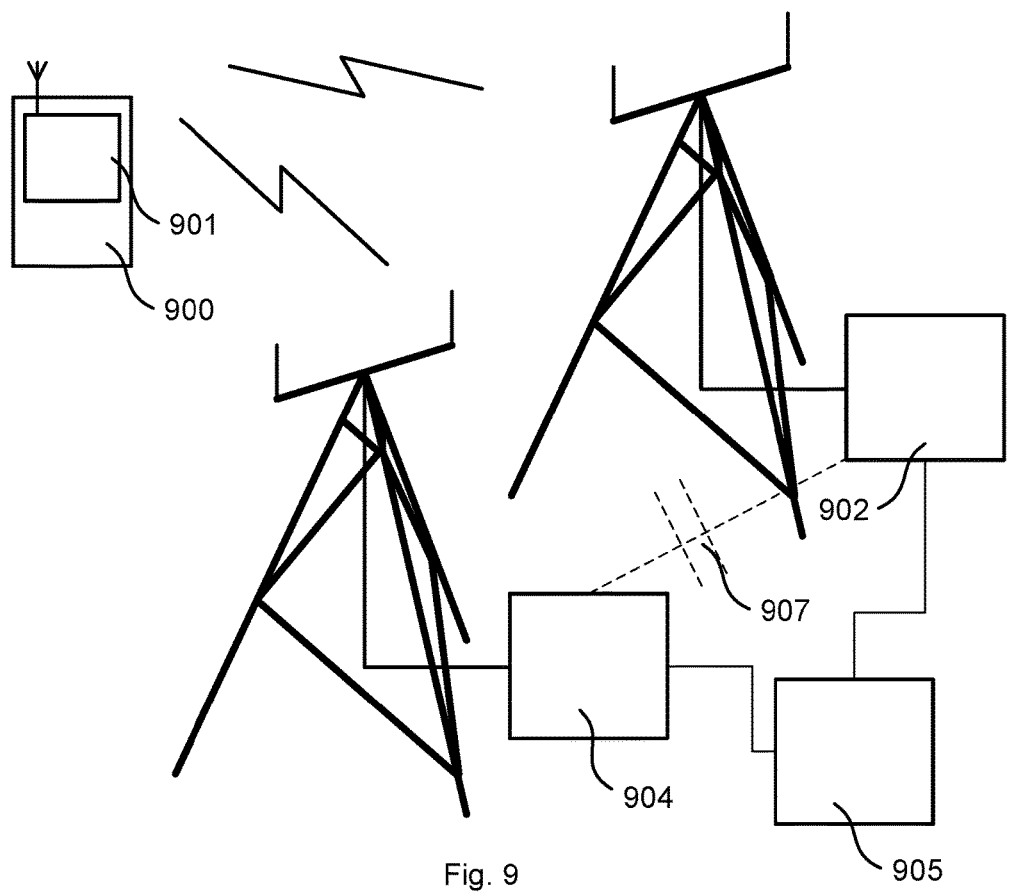
FIG. 9 schematically illustrates elements involved in the demonstrated approach.

FIG. 9 schematically illustrates elements involved in the above demonstrated approach. A UE 900 including a transceiver 901 performs measurements on a first and a second cell, above called Cell A and Cell B, which are operated by a first and a second NW node 902, 904. The first and the second NW nodes 902, 904 may be connected to a third NW node 905 and/or mutually connected via some interface 907. One or more of the NW nodes 902, 904, 905 may be arranged to perform the method demonstrated above for facilitating measurements made by the UE 900. The UE 900 may be arranged to perform the method demonstrated above with reference to FIG. 4 for making the measurements, with or without the facilitating actions of any one of NW nodes 902, 904, 905.

Figure 10:
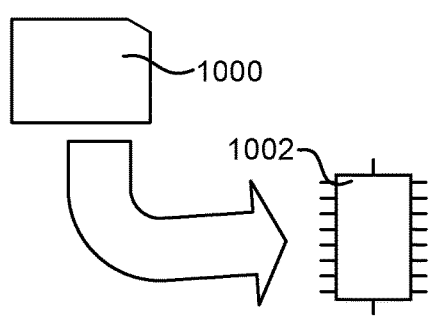
FIG. 10 schematically illustrates a computer-readable medium and a processing device.

The methods according to the approaches demonstrated above are suitable for implementation with aid of processing means, such as computers and/or processors, especially for the case where the processing element 608 demonstrated above or processors 202 or 212 demonstrated below comprises a processor handling measurements in the UE or enabling facilitated measurement for the UE by any of the NW nodes. Therefore, there is provided computer programs, comprising instructions arranged to cause the processing means, processor, or computer to perform the steps of any of the methods according to any of the embodiments described with reference to FIGS. 1 to 6 and 8. The computer programs preferably comprises program code which is stored on a computer readable medium 1000, as illustrated in FIG. 10, which can be loaded and executed by a processing means, processor, or computer 1002 to cause it to perform the methods, respectively, according to embodiments demonstrated above, preferably as any of the embodiments described with reference to FIGS. 1 to 6, 8 and 12. The computer 1002 and computer program product 1000 can be arranged to execute the program code sequentially where actions of the any of the methods are performed stepwise. The processing means, processor, or computer 1002 is preferably what normally is referred to as an embedded system. Thus, the depicted computer readable medium 1000 and computer 1002 in FIG. 10 should be construed to be for illustrative purposes only to provide understanding of the principle, and not to be construed as any direct illustration of the elements.

Figure 11:
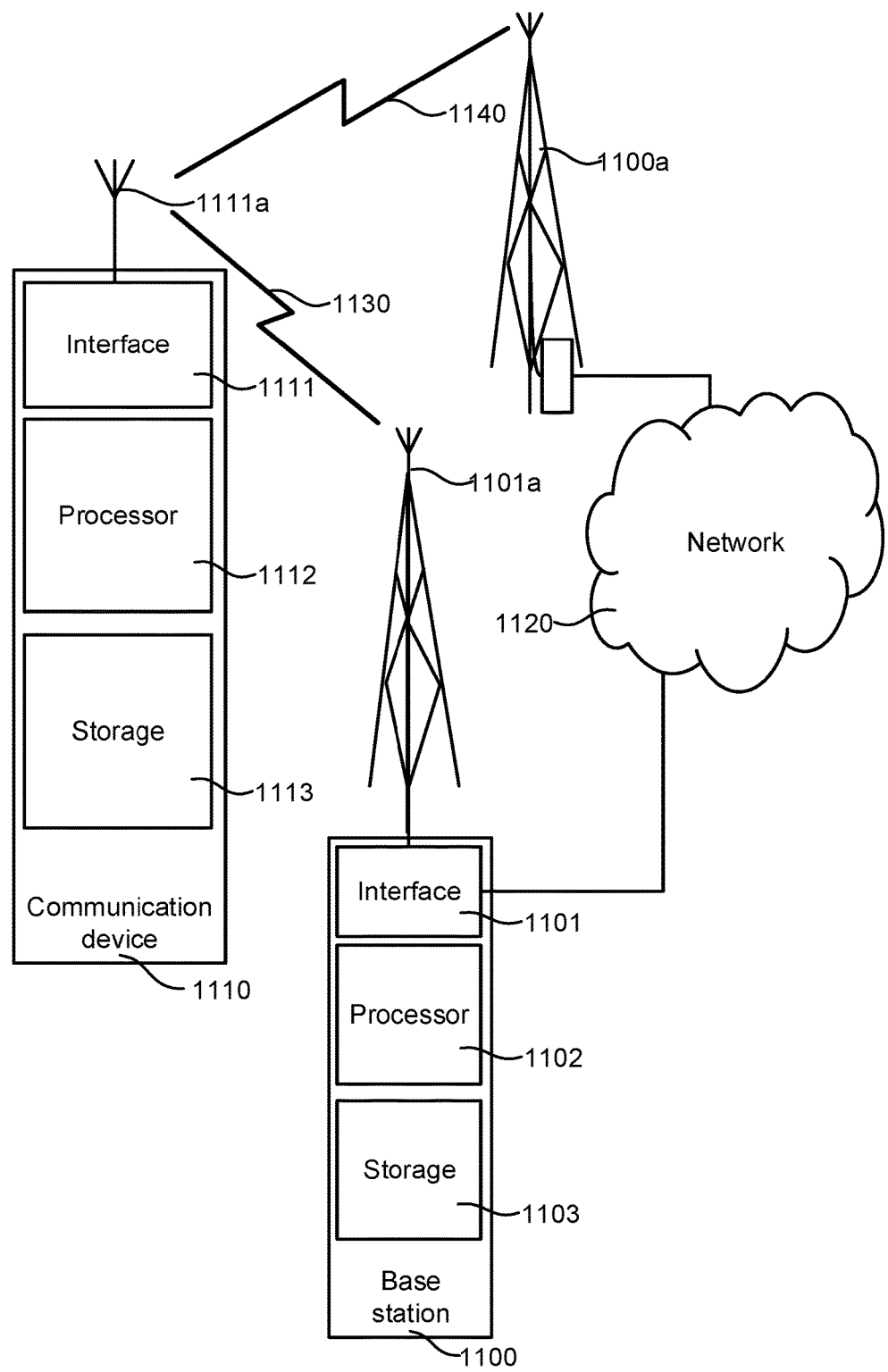
FIG. 11 illustrates a wireless network including network nodes and a wireless device.

FIG. 11 illustrates a wireless network comprising NW nodes 1100 and 1100a and a wireless device 1110 with a more detailed view of the network node 1100 and the communication device 1110 in accordance with an embodiment. For simplicity, FIG. 11 only depicts core network 1120, network nodes 1100 and 1100a, and communication device 1110. Network node 1100 comprises a processor 1102, storage 1103, interface 1101, and antenna 1101a. Similarly, the communication device 1110 comprises a processor 1112, storage 1113, interface 1111 and antenna 1111a. These components may work together in order to provide network node and/or wireless device functionality as demonstrated above. In different embodiments, the wireless network may comprise any number of wired or wireless networks, network nodes, base stations, controllers, wireless devices, relay stations, and/or any other components that may facilitate or participate in the communication of data and/or signals whether via wired or wireless connections.

The network 1120 may comprise one or more IP networks, public switched telephone networks (PSTNs), packet data networks, optical networks, wide area networks (WANs), local area networks (LANs), wireless local area networks (WLANs), wired networks, wireless networks, metropolitan area networks, and other networks to enable communication between devices. The network 1120 may comprise a network node for performing the method demonstrated with reference to FIG. 8, and/or an interface for signalling between network nodes 1100, 1100a.

The network node 1100 comprises a processor 1102, storage 1103, interface 1101, and antenna 1101a. These components are depicted as single boxes located within a single larger box. In practice however, a network node may comprise multiple different physical components that make up a single illustrated component (e.g., interface 1101 may comprise terminals for coupling wires for a wired connection and a radio transceiver for a wireless connection). Similarly, network node 1100 may be composed of multiple physically separate components (e.g., a NodeB component and an RNC component, a BTS component and a BSC component, etc.), which may each have their own respective processor, storage, and interface components. In certain scenarios in which network node 1100 comprises multiple separate components (e.g., BTS and BSC components), one or more of the separate components may be shared among several network nodes. For example, a single RNC may control multiple NodeB's. In such a scenario, each unique NodeB and BSC pair, may be a separate network node. In some embodiments, network node 1100 may be configured to support multiple radio access technologies (RATs). In such embodiments, some components may be duplicated (e.g., separate storage 1103 for the different RATs) and some components may be reused (e.g., the same antenna 1101a may be shared by the RATs).

The processor 1102 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in conjunction with other network node 1100 components, such as storage 1103, network node 1100 functionality. For example, processor 1102 may execute instructions stored in storage 1103. Such functionality may include providing various wireless features discussed herein to a wireless device, such as the wireless device 1110, including any of the features or benefits disclosed herein.

Storage 1103 may comprise any form of volatile or non-volatile computer readable memory including, without limitation, persistent storage, solid state memory, remotely mounted memory, magnetic media, optical media, random access memory (RAM), read-only memory (ROM), removable media, or any other suitable local or remote memory component. Storage 1103 may store any suitable instructions, data or information, including software and encoded logic, utilized by the network node 1100. the storage 1103 may be used to store any calculations made by the processor 1102 and/or any data received via the interface 1101.

The network node 1100 also comprises the interface 1101 which may be used in the wired or wireless communication of signalling and/or data between network node 1100, network 1120, and/or wireless device 1110. For example, the interface 1101 may perform any formatting, coding, or translating that may be needed to allow network node 1100 to send and receive data from the network 1120 over a wired connection. The interface 1101 may also include a radio transmitter and/or receiver that may be coupled to or a part of the antenna 1101a. The radio may receive digital data that is to be sent out to other network nodes or wireless devices via a wireless connection. The radio may convert the digital data into a radio signal having the appropriate channel and bandwidth parameters. The radio signal may then be transmitted via antenna 1101a to the appropriate recipient (e.g., the wireless device 1110).

The antenna 1101a may be any type of antenna capable of transmitting and receiving data and/or signals wirelessly. In some embodiments, antenna 1101a may comprise one or more omnidirectional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. The antenna 1101a may comprise one or more elements for enabling different ranks of SIMO, MISO or MIMO operation.

The wireless device 1110 may be any type of communication device, wireless device, UE, D2D device or ProSe UE, but may in general be any device, sensor, smart phone, modem, laptop, Personal Digital Assistant (PDA), tablet, mobile terminal, smart phone, laptop embedded equipped (LEE), laptop mounted equipment (LME), Universal Serial Bus (USB) dongles, machine type UE, UE capable of machine to machine (M2M) communication, etc., which is able to wirelessly send and receive data and/or signals to and from a network node, such as network node 1100 and/or other wireless devices. The wireless device 1110 comprises a processor 1112, storage 1113, interface 1111, and antenna 1111a. Like the network node 1100, the components of the wireless device 1110 are depicted as single boxes located within a single larger box, however in practice a wireless device may comprises multiple different physical components that make up a single illustrated component (e.g., storage 1113 may comprise multiple discrete microchips, each microchip representing a portion of the total storage capacity).

The processor 1112 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in combination with other wireless device 1110 components, such as storage 1113, wireless device 1110 functionality. Such functionality may include providing various wireless features discussed herein, including any of the features or benefits disclosed herein.

The storage 1113 may be any form of volatile or non-volatile memory including, without limitation, persistent storage, solid state memory, remotely mounted memory, magnetic media, optical media, random access memory (RAM), read-only memory (ROM), removable media, or any other suitable local or remote memory component. The storage 1113 may store any suitable data, instructions, or information, including software and encoded logic, utilized by the wireless device 1110. The storage 1113 may be used to store any calculations made by the processor 1112 and/or any data received via the interface 1111.

The interface 1111 may be used in the wireless communication of signalling and/or data between the wireless device 1110 and the network nodes 1100, 1100a. For example, the interface 1111 may perform any formatting, coding, or translating that may be needed to allow the wireless device 1110 to send and receive data to/from the network nodes 1100, 1100a over a wireless connection. The interface 1111 may also include a radio transmitter and/or receiver that may be coupled to or a part of the antenna 1111a. The radio may receive digital data that is to be sent out to e.g. the network node 1101 via a wireless connection. The radio may convert the digital data into a radio signal having the appropriate channel and bandwidth parameters. The radio signal may then be transmitted via the antenna 1111a to e.g. the network node 1100.

The antenna 1111a may be any type of antenna capable of transmitting and receiving data and/or signals wirelessly. In some embodiments, antenna 1111a may comprise one or more omnidirectional, sector or panel antennas operable to transmit/receive radio signals between 2 GHz and 66 GHz. For simplicity, antenna 1111a may be considered a part of interface 1111 to the extent that a wireless signal is being used. The antenna 1111a may comprise one or more elements for enabling different ranks of SIMO, MISO or MIMO operation.

In some embodiments, the components described above may be used to implement one or more functional modules used for enabling measurements as demonstrated above. The functional modules may comprise software, computer programs, sub-routines, libraries, source code, or any other form of executable instructions that are run by, for example, a processor. In general terms, each functional module may be implemented in hardware and/or in software. Preferably, one or more or all functional modules may be implemented by the processors 1112 and/or 1102, possibly in cooperation with the storage 1113 and/or 1103. The processors 1112 and/or 1102 and the storage 1113 and/or 1103 may thus be arranged to allow the processors 1112 and/or 1102 to fetch instructions from the storage 1113 and/or 1103 and execute the fetched instructions to allow the respective functional module to perform any features or functions disclosed herein. The modules may further be configured to perform other functions or steps not explicitly described herein but which would be within the knowledge of a person skilled in the art.

Certain aspects of the inventive concept have mainly been described above with reference to a few embodiments. However, as is readily appreciated by a person skilled in the art, embodiments other than the ones disclosed above are equally possible and within the scope of the inventive concept. Similarly, while a number of different combinations have been discussed, all possible combinations have not been disclosed. One skilled in the art would appreciate that other combinations exist and are within the scope of the inventive concept. Moreover, as is understood by the skilled person, the herein disclosed embodiments are as such applicable also to other standards and communication systems and any feature from a particular figure disclosed in connection with other features may be applicable to any other figure and or combined with different features.

The invention claimed is:

1. A method of a wireless device configured to perform measurements of signals wirelessly transmitted from at least one network node and being associated with a first cell and a second cell, respectively, the signals to be measured comprising signals of a first type and a second type, the method comprising:
   determining whether the signals of the first type associated with the first cell and the second cell occur simultaneously, the signals of the first type being narrowband secondary synchronization signals and the signals of the second type being narrowband reference signals;
   if the signals of the first type associated with the first cell and the second cell occur simultaneously, measuring the signal of the first type associated with the first cell and measuring the signal of the second type associated with the second cell, and
   if the signals of the first type associated with the first cell and the second cell do not occur simultaneously, measuring the signal of the first type associated with the first cell and the signal of the first type associated with the second cell.

2. The method of claim 1, further comprising determining a transmit power of the respective types of signals.

3. The method of claim 2, wherein the determining of the transmit power of the respective types of signals comprises receiving information about the transmit power of the respective types of signals from a network node.

4. The method of claim 3, wherein the information about the transmit power of the respective types of signals comprises information about a relation between the transmit powers of the respective types of signals.

5. The method of claim 4, wherein the determining of the transmit power of the respective types of signals comprises estimating a difference in powers of the respective types of signals from signals of the respective types received during a transmission limited in time.

6. The method of claim 3, wherein the determining of the transmit power of the respective types of signals comprises estimating a difference in powers of the respective types of signals from signals of the respective types received during a transmission limited in time.

7. The method of claim 2, wherein the determining of the transmit power of the respective types of signals comprises estimating a difference in powers of the respective types of signals from signals of the respective types received during a transmission limited in time.

8. A method of a network node configured to wirelessly transmit signals to be measured by a wireless device, the signals comprising signals of a first type and a second type, the method comprising:
   determining a timing relation of signals wirelessly transmitted from at least one network node and being associated with a first cell and a second cell;
   adjusting a timing of the signals of the first type associated with the first cell such that the signals of the first type associated with the first cell do not occur simultaneously with the signals of the first type associated with the second cell; and adjusting power of the signals of the first type to be equal to the signals of the second type, the first type of signal being different from the second type of signal, the signals of the first type being narrowband secondary synchronization signals and the signals of the second type being narrowband reference signals.

9. The method of claim 8, further comprising transmitting an indication that the signals of the first type and the signals of the second type have equal transmit powers.

10. The method of claim 8, further comprising:
determining powers of the signals of the first type and of the second type; and
transmitting information about the powers of the signals of the first type and the second type.

11. The method of claim 10, wherein the transmitted information comprises information about a relation between the transmit powers of the respective types of signals.

12. The method of claim 8, further comprising configuring, for the wireless device, a discontinuous receive, DRX, cycle not larger than a certain threshold.

13. A wireless device having a processor and a storage device configured to measure signals wirelessly transmitted from at least one network node and being associated with a first cell and a second cell, respectively, the signals to be measured comprising signals of a first type and a second type, the processor and memory measuring the signals by:
determining whether the signals of the first type associated with the first cell and the second cell occur simultaneously, the signals of the first type being narrowband secondary synchronization signals and the signals of the second type being narrowband reference signals;
if the signals of the first type associated with the first cell and the second cell occur simultaneously, measuring the signal of the first type associated with the first cell and measuring the signal of the second type associated with the second cell; and
if the signals of the first type associated with the first cell and the second cell do not occur simultaneously, measuring the signal of the first type associated with the first cell and the signal of the first type associated with the second cell.

14. The wireless device of claim 13, the processor and memory further measuring the signals by determining a transmit power of the respective types of signals.

15. A network node having a processor and a storage device configured to wirelessly transmit signals to be measured by a wireless device, the signals comprising signals of a first type and a second type, the processor and memory being configured to:
determine a timing relation of signals wirelessly transmitted from at least one network node and being associated with a first cell and a second cell;
adjust timing of the signals of the first type associated with the first cell such that the signals of the first type associated with the first cell do not occur simultaneously with the signals of the first type associated with the second cell; and adjusting power of the signals of the first type to be equal to the signals of the second type, the first type of signal being different from the second type of signal, the signals of the first type being narrowband secondary synchronization signals and the signals of the second type being narrowband reference signals.

16. A non-transitory computer readable medium storing a computer program comprising instructions which, when executed on a processor of a wireless device configured to perform measurements of signals wirelessly transmitted from at least one network node and being associated with a first cell and a second cell, respectively, the signals to be measured comprising signals of a first type and a second type, causes the wireless device to perform a method comprising:
determining whether the signals of the first type associated with the first cell and the second cell occur simultaneously, the signals of the first type being narrowband secondary synchronization signals and the signals of the second type being narrowband reference signals;
if the signals of the first type associated with the first cell and the second cell occur simultaneously, measuring the signal of the first type associated with the first cell and measuring the signal of the second type associated with the second cell; and
if the signals of the first type associated with the first cell and the second cell do not occur simultaneously, measuring the signal of the first type associated with the first cell and the signal of the first type associated with the second cell.

17. A non-transitory computer readable medium storing a computer program comprising instructions which, when executed on a processor of a network node configured to wirelessly transmit signals to be measured by a wireless device, the signals comprising signals of a first type and a second type, causes the network node to perform a method comprising:
determining a timing relation of signals wirelessly transmitted from at least one network node and being associated with a first cell and a second cell;
adjusting a timing of the signals of the first type associated with the first cell such that the signals of the first type associated with the first cell do not occur simultaneously with the signals of the first type associated with the second cell; and
adjusting power of the signals of the first type to be equal to the signals of the second type, the first type of signal being different from the second type of signal, the signals of the first type being narrowband secondary synchronization signals and the signals of the second type being narrowband reference signals.

* * * * *